(12) United States Patent
Yoo (10) Patent No.: US 8,742,705 B2
(45) Date of Patent: Jun. 3, 2014

(54) APPARATUS FOR OPERATING INTERIOR PERMANENT MAGNET SYNCHRONOUS MOTOR

(75) Inventor: Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 208 days.

(21) Appl. No.: 13/542,502

(22) Filed: Jul. 5, 2012

(65) Prior Publication Data

US 2013/0009575 A1 Jan. 10, 2013

(30) Foreign Application Priority Data

Jul. 5, 2011 (KR) .......................... 10-2011-0066625

(51) Int. Cl.
*H02P 21/00* (2006.01)

(52) U.S. Cl.
USPC ............ 318/400.02; 318/400.22; 318/400.07; 318/716; 310/156.03; 310/156.06

(58) Field of Classification Search
CPC ...... H02K 15/03; H02K 49/06; B60L 15/025; B60L 2240/427; B60L 2240/429; B60L 2240/421; B60L 2240/423; B60L 15/20; B60L 2220/14; B60L 2240/425; B60L 2240/441; H02P 21/0035; H02P 21/06; H02P 21/146; H02P 2207/05; H02P 6/085; H02P 6/14; H02P 6/06; H02P 6/10; H02P 23/0077; H02P 6/002; H02P 6/16; H02P 6/18; Y02T 10/643; Y02T 10/642; Y02T 10/7005; B62D 5/0463; B62D 5/046; B60W 10/08; H02H 7/0833; G08C 19/48; H03M 1/00; H03M 2201/01; H03M 2201/4125; H03M 2201/4233; G05D 1/0206; G05D 1/0808; G01C 17/30

USPC ........ 318/400.02, 400.06, 472.812, 490, 727, 318/767, 800, 805, 400.22, 504, 446, 434, 318/722, 400.11, 400.21, 432, 530, 714, 318/400.23, 537, 719, 139, 400.15, 802, 318/811, 400.17, 400.07, 430; 180/54.1, 180/65.1, 65.21, 65.275, 65.285, 65.265; 377/16; 361/695

See application file for complete search history.

(56) References Cited

U.S. PATENT DOCUMENTS

| | | | |
|---|---|---|---|
| 6,936,991 B2* | 8/2005 | Chen et al. ..................... | 318/700 |
| 7,023,168 B1* | 4/2006 | Patel et al. .................... | 318/757 |
| 2008/0297078 A1* | 12/2008 | Iwasaki et al. ........... | 318/400.02 |
| 2008/0297097 A1* | 12/2008 | Lee et al. ...................... | 318/701 |
| 2012/0217916 A1* | 8/2012 | Wu et al. .................. | 318/400.11 |

* cited by examiner

Primary Examiner — Shawki S Ismail
Assistant Examiner — Jorge L Carrasquillo
(74) Attorney, Agent, or Firm — Lee, Hong, Degerman, Kang & Waimey (57) ABSTRACT

Provided is an apparatus for operating interior permanent magnet synchronous motor by receiving a first current command of a flux weakening control region I in a system including a detector measuring a position and a speed of a rotor of an IPMSM, the apparatus including a feedback unit transmitting over-modulated voltage information to a correction unit, the correction unit using the rotor speed and the over-modulated voltage information to correct the first current command to a second current command of a flux weakening control region II, a control unit controlling the second current command to output a voltage, a first limit unit limiting an output of the control unit to a maximum voltage synthesizable by an inverter unit, and the inverter unit applying a 3-phase voltage command for following a command torque to the IPMSM using an output of a voltage limit unit.

9 Claims, 8 Drawing Sheets

APPARATUS FOR OPERATING INTERIOR PERMANENT MAGNET SYNCHRONOUS MOTOR

Pursuant to 35 U.S.C. §119 (a), this application claims the benefit of earlier filing date and right of priority to Korean Patent Application No. 10-2011-0066625, filed on July 5, content of which is hereby incorporated by reference in their entirety.

BACKGROUND OF THE DISCLOSURE

1. Field of Endeavor

The present disclosure relates to a motor driving apparatus, and more particularly to a driving apparatus for operating an interior permanent magnet synchronous motor at a speed higher than a rated speed.

2. Background

The information disclosed in this Background of the Invention section is only for enhancement of understanding of the background of the invention and should not be taken as an acknowledgement or any form of suggestion that this information forms the prior art that is already known to a person skilled in the art.

A permanent magnet synchronous motor (PMSM) is a high-power and high-efficiency motor that is widely used as a traction motor in the fields of electric vehicles including hybrid vehicles, fuel cell vehicles, and the like, as well as other industries.

In particular, an interior permanent magnet synchronous motor (IPMSM) is a synchronous motor having a permanent magnet inserted into a rotor iron core. The IPMSM has excellent high-speed durability and drivability, and thus is suitable for use as an electric vehicle motor. In this application fields, the IPMSM is driven in a torque control mode, where vector control is performed for independently controlling a flux current and a torque current.

Furthermore, the IPMSM used for electric vehicles or hybrid vehicles is very wide in a driving speed range of a rotor to even include a flux weakening control region II in the driving regions. The flux weakening control region II defines a case where a center of a voltage limit ellipse of the IPMSM is positioned inside a current limit circle.

In the flux weakening control region II, only the voltage limit condition affects a driving limit condition of the IPMSM, and because size of DC-link voltage of an inverter is limited, maximum use of the voltage limit condition is advantageous in terms of output torque.

Figure 1:
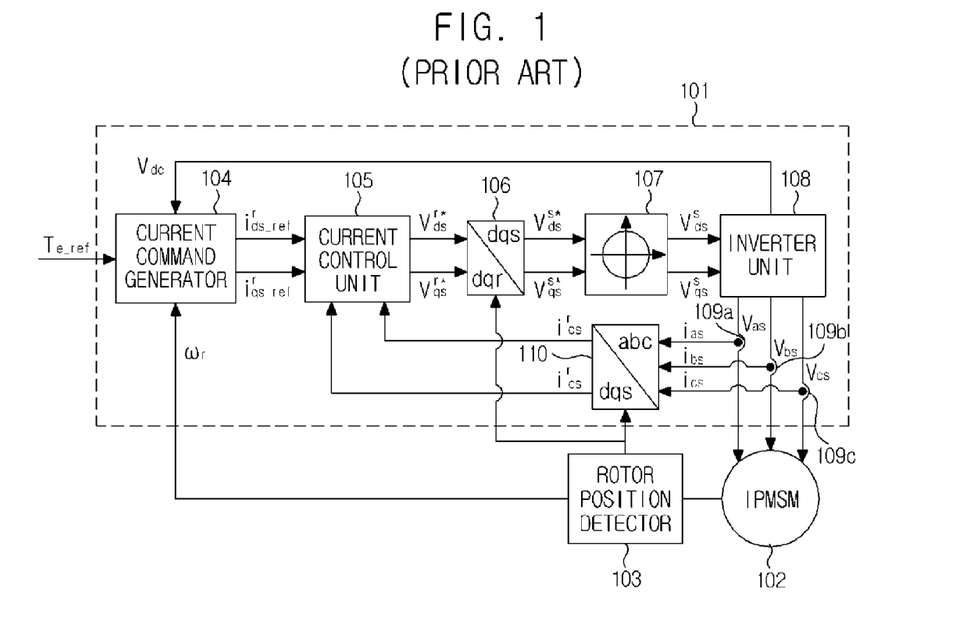
FIG. 1 is a schematic block diagram illustrating an IPMSM according to prior art.

FIG. 1 is a block diagram illustrating a driving system of an interior permanent magnet synchronous motor according to prior art, where the system is driven by an inverter embodied by a vector control independently controlling a flux current and a torque current from an instruction torque.

The conventional driving system includes an inverter (101), an IPMSM (102) and a rotor position detector (103) attached to a rotor of the IPMSM.

The inverter (101) receives a command torque to output voltages (Vas, Vbs, Vcs) capable of being driven by the command torque, and the rotor position detector (103) calculates or measures a rotor position or a rotor speed.

The rotor position calculated or measured by the rotor position detector (103) is used for coordinate change by coordinate converters (106, 110), and the rotor speed is used by a current command generator (104).

The current command generator (104) outputs a current command on a synchronous reference frame in response to the command torque, the rotor speed, and the DC-link voltage of inverter. In case of IPMSM, the current command generator (104) generally uses two or more 2-D look-up tables, where the look-up table outputs d and q-axes current commands on synchronous reference frame relative to an entire driving region.

A current regulator (105) serves to control the current commands obtained from the current command generator (104) to output d and q-axes voltages on the synchronous reference frame.

The coordinate converter (106) uses the rotor position information obtained by the rotor position detector (103) to convert an output voltage of a current controller (105) to a voltage on a stationary reference frame.

A voltage limiter (107) uses an inscribed circle of a voltage limit hexagon to convert a voltage of the coordinate converter (106) to a voltage synthesizable by an inverter unit (108). The voltage limit condition of the voltage limiter (107) is determined by the DC-link voltage, and the voltage positioned at an outside of the inscribed circle of the voltage limit hexagon is prevented from being outputted and stays on the inscribed circle of the voltage limit hexagon.

The inverter unit (108) is a voltage type inverter including a power semiconductor such as an IGBT (Insulated Gate Bipolar Transistor) or a MOSFET (Metal Oxide Semiconductor Field-Effect Transistor), and supplies the voltage commands (Vas, Vbs, Vcs) for following a command torque to the IPMSM (102).

A current sensor (109) is interposed between the IPMSM (102) and the inverter (108) to measure a phase current applied to the IPMSM (102), and the current measured by the current sensor (109) is returned as a feedback to the current command generator (104) and the current controller (105) in response to the coordinate conversion of the coordinate converter (110).

Figure 2:
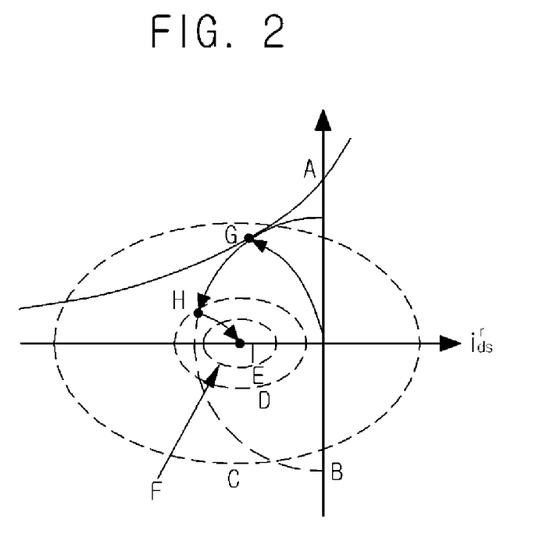
FIG. 2 is an exemplary view illustrating a driving region of IPMSM of FIG. 1.

FIG. 2 is an exemplary view illustrating a driving region of the IPMSM of FIG. 1, where A is a curve of a constant torque, and currents on d and q-axes on the synchronous reference frame relative to a constant command torque may have an infinite combination, B is a current limiting condition of inverter, and C, D and E are examples of voltage limit condition in response to rotor speed, where the voltage limit condition is changed by rotor speed, and an increased rotor speed reduces the size of a voltage limit ellipse to an F direction.

The sizes of d and q-axes currents on the synchronous reference frame controllable by the inverter (101) relative to the constant command torque are determined in a range satisfying both the current limit condition and the voltage limit condition. In a case a voltage margin is sufficient, the voltage limit condition is not affected by the limiting conditions, such that it would be advantageous to track a current command driving a MTPA (Maximum Torque Per Ampere) in terms of efficiency of IPMSM.

For example, in case a predetermined torque command of A is given, and a voltage limit condition is given as C, a current command to track a command torque is determined at G, where G is a driving point for satisfying the MTPA, and a region where only the current limit condition influences the driving point is defined as a constant torque region.

In a case a rotor speed increases to cause the voltage limit condition to move from C to D, a driving point moves from G to H along an arrow direction, because G is a current region uncontrollable by an inverter. Here, a region, where both the voltage limit condition and the current limit condition influence the driving point, as in the region where the driving point moves from G to H, is defined as a flux weakening control region I.

In a case a rotor speed further increases to cause the voltage limit condition to move from D to E, the current limit condition can no longer influence the driving region, and only the voltage limit condition can influence the driving point.

Here, a region where only the voltage limit condition influences the driving point is defined as a flux weakening control region II. The driving point at the flux weakening control region II moves from H to I along an arrow direction. Voltage Equations on the synchronous reference frame of IPMSM (102) are provided as below:

$$V_{ds}^r = R_s i_{ds}^r + L_{ds}\frac{d i_{ds}^r}{dt} - \omega_r \lambda_{qs}^r \quad \text{[Equation 1]}$$

$$V_{qs}^r = R_s i_{qs}^r + L_{qs}\frac{d i_{qs}^r}{dt} - \omega_r \lambda_{ds}^r \quad \text{[Equation 2]}$$

where, a superscript 'r' is a synchronous reference frame, a subscript 's' is a variable of stationary reference frame, '$\omega_r$' is an angular velocity of rotor, '$i_{ds}^r$' and '$i_{qs}^r$' are respectively stator d and q-axes currents on the synchronous reference frame, '$V_{ds}^r$' and '$V_{qs}^r$' are respectively stator d and q-axes voltages on the synchronous reference frame, '$\lambda_{ds}^r$' and '$\lambda r_{qs}^r$' are respectively stator d and q-axes rotor fluxes on the synchronous reference frame, $R_s$, $L_{ds}$ and $L_{qs}$ are respectively stator resistance d and q-axes inductances.

A driving limit condition of IPMSM (102) is divided to a voltage limit condition and a current limit condition, and expressed as under:

$$(V_{ds}^r)^2 + (V_{qs}^r)^2 \leq (V_{s,max})^2 \quad \text{[Equation 3]}$$

$$(I_{ds}^r)^2 + (I_{qs}^r)^2 \leq (I_{s,max})^2 \quad \text{[Equation 4]}$$

where, $V_{s,max}$ defines a size of maximum voltage synthesizable by the inverter (101), and $I_{s,max}$ defines a maximum or rated current of IPMSM (102). $V_{s,max}$ is a maximum voltage synthesizable by the inverter (10) and influenced by the size of the DC-link voltage '$V_{dc}$', and in a case the voltage limit condition is selected by the inscribed circle of voltage limit hexagon as in the voltage limiter (107) of FIG. 1, $V_{s,max}$ may have the following value.

$$V_{a,max} = \frac{V_{dc}}{\sqrt{3}} \quad \text{[Equation 5]}$$

As noted from the foregoing, the IPMSM (102) in the flux weakening control region II is driven at the MTPV (Maximum Torque Per Voltage) capable of outputting an available voltage at a maximum torque.

The moving process of current command is such that an inductance of the IPMSM (102) is saturated by the size of the current to have a non-linear relationship. Thus, the driving of the IPMSM is such that characteristic of IPMSM is measured in advance (off-line) to prepare at least two or more 2-D look-up tables, whereby the current command generator (104) of FIG. 1 generates a current command on the synchronous reference frame responsive to the constant torque, the driving speed and the DC-link voltage.

The 2-D look-up table uses the torque command and the flux information as input to generate the d and q-axes current command on the synchronous reference frame. At this time, the flux information is obtained by dividing the DC-link voltage by rotor speed.

Figure 3:
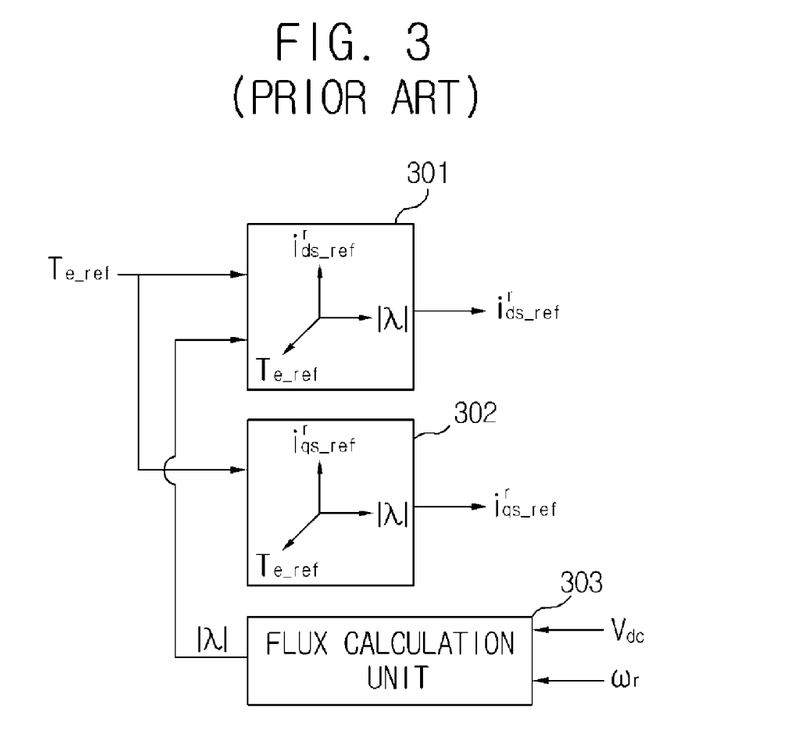
FIG. 3 is a schematic block diagram illustrating a 2-D look-up table according to prior art.

FIG. 3 is a schematic view illustrating a 2-D look-up table according to prior art. Referring to FIG. 3, the 2-D look-up tables (301, 302) receive the command torque and an input from a flux calculation unit (303) to output the d and q-axes current commands on the synchronous reference frame.

A feedback current of the current command generator (104) of FIG. 1 and the coordinate converter (110) is inputted to the current limiter (105). The current limiter (105) is a proportional and integral controller to synthesize an output voltage as per the following Equations.

$$V_{ds}^{r*} = \left(K_{pd} + \frac{K_{id}}{s}\right)(i_{ds-ref}^r - i_{ds}^r) - \omega_r \lambda_{qs}^r \quad \text{[Equation 6]}$$

$$V_{qs}^{r*} = \left(K_{pd} + \frac{K_{iq}}{s}\right)(i_{qs-ref}^r - i_{qs}^r) - \omega_r \lambda_{ds}^r \quad \text{[Equation 7]}$$

The coordinate converter (106) converts an output voltage of the current limiter (105) on the synchronous reference frame to a voltage on the stationary reference frame using the following Equations.

$$V_{ds}^{s*} = V_{ds}^{r*}\cos\theta - V_{qs}^{r*}\sin\theta \quad \text{[Equation 8]}$$

$$V_{qs}^{s*} = V_{ds}^{r*}\cos\theta + V_{qs}^{r*}\sin\theta \quad \text{[Equation 9]}$$

The voltage limiter (107) limits a voltage of the coordinate converter (106) and outputs the voltage, so that a voltage command can exist within the inscribed circle of the voltage limit condition expressed by a hexagon on the stationary reference frame, and the inverter unit (108) synthesize a voltage of the following Equations from the voltage limiter (107) and supplies the voltage to the IPMSM (102).

$$V_{as} = V_{ds}^s \quad \text{[Equation 10]}$$

$$V_{bs} = -\frac{1}{2}V_{ds}^s + \frac{\sqrt{3}}{2}V_{qs}^s \quad \text{[Equation 11]}$$

$$V_{cs} = -\frac{1}{2}V_{ds}^s - \frac{\sqrt{3}}{2}V_{qs}^s \quad \text{[Equation 12]}$$

Current sensors (109a-109c) measure a phase current between the inverter unit (108) and the IPMSM (102). The coordinate converter (110) converts the phase current to a current on the synchronous reference frame using the following Equations and provides the current to the current limiter (105) as a feedback.

$$I_{ds}^s = \frac{2i_{as} - i_{bs} - i_{cs}}{3} \quad \text{[Equation 13]}$$

$$I_{qs}^s = \frac{i_{bs} - i_{cs}}{2} \quad \text{[Equation 14]}$$

$$i_{ds}^r = i_{ds}^s \cos\theta + i_{qs}^s \sin\theta \quad \text{[Equation 15]}$$

$$i_{qs}^r = -i_{ds}^s \sin\theta + i_{qs}^s \cos\theta \quad \text{[Equation 16]}$$

However, there is a problem in that performance of the IPMSM driving system of FIG. 1 deteriorates, because the current command generator (104) uses a pre-measured look-up table to cause subject parameters of the IPMSM to change.

Furthermore, there is another problem in that, even if the subject parameters of the IPMSM are not changed, the driving performance of motor is determined by performance of the look-up table, because the look-up table determines the performance of an entire driving region.

There is still another problem in that a voltage utilization rate of the inverter decreases to thereby decrease the output torque, because amount of voltage synthesized by the inverter is limited by the inscribed circle of the voltage limit hexagon.

It is, therefore, desirable to overcome the above problems and others by providing an improved apparatus for operating the interior permanent magnet synchronous motor.

SUMMARY OF THE DISCLOSURE

This section provides a general summary of the disclosure, and is not a comprehensive disclosure of its full scope or all of its features.

The present disclosure has been made to solve the foregoing problem(s) of the prior art, and therefore an object of certain embodiments of the present invention is to provide an apparatus for operating interior permanent magnet synchronous motor robust in parameter change by reducing dependency on look-up table during a high speed driving of an IPMSM, increasing a voltage utilization rate of an inverter, following a command torque to a maximum and generating a current command following the command torque to the maximum.

In one general aspect of the present disclosure, there is provided an apparatus for operating interior permanent magnet synchronous motor (IPMSM) by receiving a first current command of a flux weakening control region I in a system including a detector measuring a position and a speed of a rotor of the IPMSM, the apparatus comprising: a feedback unit transmitting over-modulated voltage information to a correction unit; the correction unit using the rotor speed and the over-modulated voltage information to correct the first current command to a second current command of a flux weakening control region II; a control unit controlling the second current command to output a voltage; a first limit unit limiting an output of the control unit to a maximum voltage synthesizable by an inverter unit; and the inverter unit applying a 3-phase voltage command for following a command torque to the IPMSM using an output of a voltage limit unit.

Preferably, but not necessarily, the apparatus further comprises a first conversion unit converting a voltage of the control unit on synchronous reference frame to a voltage on stationary reference frame using position information of the rotor received from the detector and outputting the converted voltage to the first limit unit.

Preferably, but not necessarily, the apparatus further comprises a current sensor measuring a phase current outputted from the inverter unit to the IPMSM.

Preferably, but not necessarily, the apparatus further comprises a second conversion unit converting a phase current on stationary reference frame received from the current sensor to a current on the synchronous reference frame and providing the converted current to the correction unit and the control unit.

Preferably, but not necessarily, the feedback unit feedbacks the over-modulated voltage between the output of the control unit and the voltage synthesized by the inverter unit to the correction unit.

Preferably, but not necessarily, the feedback unit integrates and high-pass filters a size of the over-modulated voltage, and transmits the high-pass filtered size to the correction unit.

Preferably, but not necessarily, the correction unit comprises a processing unit correcting the first current command to generate the second current command in case of flux weakening control region II, and a second limit unit limiting a size of current from the second current command.

Preferably, but not necessarily, the processing unit comprises a decision unit determining the flux weakening control region II, a determination unit determining a direction of correction of current command, a calculation unit calculating a proportional gain using a current rotor speed and a maximum rotor speed, a third limit unit limiting a size of the current change, a section defining unit defining a hysteresis section for dividing the flux weakening control region I and the flux weakening control region II, and an adding unit outputting the second current command by adding a reference current to an output of the section defining unit.

Preferably, but not necessarily, the second limit unit limits the second current command to a current range outputtable by the inverter unit.

Preferably, but not necessarily, the second limit unit provides a priority to a d-axis current on the synchronous reference frame relative to the second current command, outputs the d-axis current within the size of a rated current on a priority base, and selects a q-axis current command in a permissible range a balance where a size of d-axis current is deducted from the rated current.

Preferably, but not necessarily, the first limit unit limits an output of the control unit by using a voltage limit hexagon.

The apparatus for operating interior permanent magnet synchronous motor according to the present disclosure has an advantageous effect in that a difference between two voltages is minimized using a difference between an output voltage of a current control unit and a voltage actually synthesized by an inverter unit and dispensing with a prior-prepared look-up table, all the voltage limit hexagons are used to increase a DC-link voltage utilization rate of the inverter unit relative to size of the voltage synthesized by the inverter unit, and a current command is corrected to a direction holding a torque at a predetermined level, whereby a maximum torque can be followed even when an IPMSM is driven at a high speed.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, an apparatus for operating an IPMSM according to the present disclosure will be described in detail with reference to the accompanying drawings.

Figure 4:
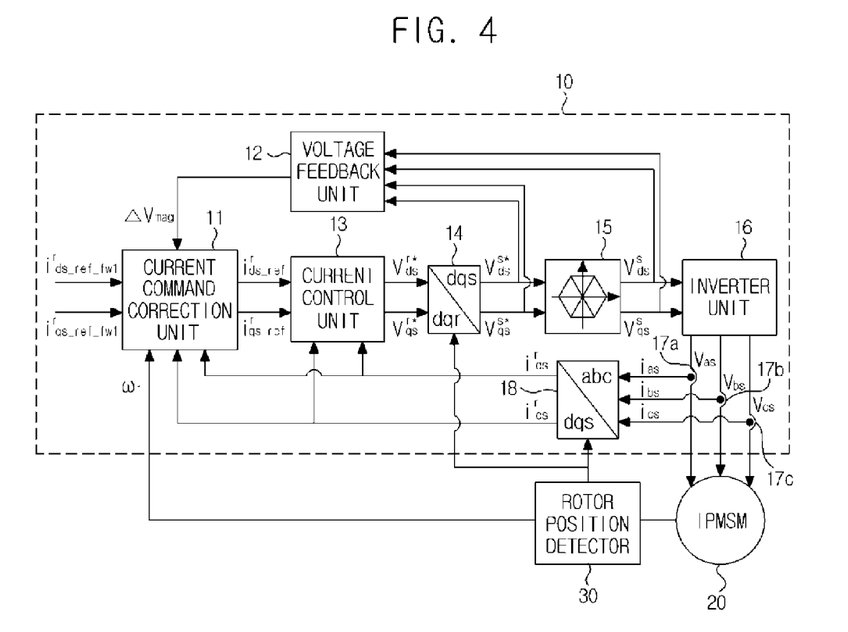
FIG. 4 is a schematic block diagram illustrating an apparatus for operating an IPMSM according to an exemplary embodiment of the present disclosure.

FIG. 4 is a schematic block diagram illustrating an apparatus for operating an IPMSM according to an exemplary embodiment of the present disclosure. Referring to FIG. 4, an apparatus for operating an IPMSM comprises an inverter (10) including a current command correction unit (11), a voltage feedback unit (12), a current controller (13), a voltage coordinate converter (14), a voltage limiter (15), an inverter unit (16), current sensors (17a-17c), and a current coordinate converter (18), and a rotor position detector (30).

The inverter (10) receives a current command of a flux weakening control region I, and outputs voltages $V_{as}$, $V_{bs}$, $V_{cs}$ by which an IPSMS (20) can be driven by a current command.

A rotor of the IPMSM (20) is provided with a rotor position detector (30) to calculate or measure a rotor position and a rotor speed. The rotor position measured by the rotor position detector (30) is used for coordinate conversion of the voltage coordinate converter (14) and the current coordinate converter (18), where the rotor speed is inputted into the current command correction unit (11).

The current command correction unit (11) corrects the current command to allow the IPMSM (20) from the flux weakening control region I to stably operate at a high speed, a detailed description of which will be provided later.

The voltage feedback unit (12) serves to calculate feedback voltage information used by the current command correction unit (11). The voltage feedback unit (12) functions to transmit over-modulated voltage information to obtain a difference of output voltage between the first coordinate converter (14) and the voltage limiter (15).

The current controller (13) serves to limit a current command, which is an output of the current command correction unit (11), to output d and q-axes voltages on synchronous reference frame. The current controller (13) is a proportional integral (PI) controller but is not limited thereto.

The first coordinate converter (14) uses the position information of the rotor obtained by the rotor position detector (30) to convert the output voltage of the current controller (13) to a voltage on a stationary reference frame. The voltage limiter (15) uses a voltage limit hexagon to limit the output voltage of the first coordinate converter (14) to a voltage synthesizable by the inverter unit (16).

The voltage limit hexagon used by the voltage limiter (15) is a maximum voltage synthesizable by the inverter unit (16), whereby a voltage utilization rate of the inverter unit (16) may be maximized by the voltage limit hexagon.

In a case the output voltage of the first coordinate converter (14) is situated outside of the voltage limit hexagon of the voltage limiter (15), the voltage synthesized by the inverter unit (16) exists on a hexagon of the voltage limiter (15), with the voltage of the voltage coordinate converter (14) not being outputted.

The inverter unit (16) is a voltage type inverter including a power semiconductors such as an IGBT (insulated gate bipolar mode transistor) or a power MOSFET (metal oxide silicon field effect transistor), and applies the voltage commands ($V_{as}$, $V_{bs}$, $V_{cs}$) for following the current command to the IPMSM (20).

The current sensors (17a-17c) measures a phase current between the IPMSM (20) and the inverter unit (16). The current measured by the current sensors (17a-17c) is returned to the current controller (13) and the current command correction unit (11) as a feedback in response to the coordinate conversion by the second coordinate converter (18). The second coordinate converter (18) serves to convert the phase current on the stationary reference frame measured by the current sensors (17a-17c) to that on the synchronous reference frame.

A difference between the conventional driving system of FIG. 1 and the operating apparatus of FIG. 4 may be summarized in two words. That is, a current command correction which is an input of the current controllers (105 and 13), and a final output voltage synthesis applied to the inverter units (108 and 16).

In the conventional system of FIG. 1, a command current of the current controller (105) is obtained from a torque command of the current command generator (104), the DC-link voltage of the inverter unit (108) and at least two or more 2-D look-up tables based on rotor speed, whereas the command current of the current controller (13) is calculated by the current command correction unit (11) in the operating apparatus of the present invention.

Furthermore, in case of final output voltage applied to the inverter units (108) in the conventional system, the final output voltage is controlled by an inscribed circle of the voltage limit hexagon, whereas the voltage limit hexagon is used to limit the final output voltage in the present invention. Thus, the size of the voltage synthesized by the operating apparatus of the present invention becomes relatively greater than that of the conventional system of FIG. 1 to increase the voltage utilization rate of the inverter and to increase the output torque as well.

Now, the current command correction of the operating apparatus of the present invention based on FIG. 4 will be described. First, a condition to discriminate the flux weakening control region I and the flux weakening control region II is provided as below:

$$-\frac{\partial T_e}{\partial i_{ds}^r}\frac{\partial |\lambda_{dqs}^r|^2}{\partial i_{qs}^r} + \frac{\partial T_e}{\partial i_{qs}^r}\frac{\partial |\lambda_{dqs}^r|^2}{\partial i_{ds}^r} = 0 \quad \text{[Equation 17]}$$

A torque and flux of the IPMSM (20) may be obtained by the following Equations:

$$T_e = \frac{3}{2}\frac{P}{2}[(L_{ds}-L_{qs})i_{ds}^r + \lambda_f]i_{qs}^r \quad \text{[Equation 18]}$$

$$\lambda_{ds}^r = L_{ds}i_{ds}^r + \lambda_f \quad \text{[Equation 19]}$$

$$\lambda_{qs}^r = L_{qs}i_{qs}^r + \lambda_f \quad \text{[Equation 20]}$$

Equation 21 may be obtained from Equation 18.

$$\left(-\frac{\partial T_e}{\partial i_{qs}^r}, \frac{\partial T_e}{\partial i_{ds}^r}\right) = \frac{3}{2}\frac{P}{2}(-(L_{ds}-L_{qs})i_{ds}^r + \lambda_f, (L_{ds}-L_{qs})i_{qs}^r) \quad \text{[Equation 21]}$$

Furthermore, normalization of Equation 21 may be defined as under:

$$(X_{norm}, Y_{norm}) = \frac{1}{\sqrt{[(L_{ds}-L_{qs})i_{ds}^r + \lambda_f]^2 + [(L_{ds}-L_{qs})i_{qs}^r]^2}} \quad \text{[Equation 22]}$$

$$[-(L_{ds}-L_{qs})i_{ds}^r - \lambda_f, (L_{ds}-L_{qs})i_{qs}^r]$$

The following Equation may be obtained from Equations 19 and 20.

$$\left(-\frac{\partial |\lambda_{dqs}^r|^2}{\partial i_{ds}^r}, -\frac{\partial |\lambda_{dqs}^r|^2}{\partial i_{qs}^r}\right) = \quad \text{[Equation 23]}$$

$$(-2L_{ds}(L_{ds}i_{ds}^r + \lambda_f), -2L_{qs}(L_{qs}i_{qs}^r))$$

Normalization of Equation 23 may be defined as follows:

$$(V_{norm}, W_{norm}) = \frac{1}{\sqrt{[L_{ds}(L_{ds}+i_{ds}^r)]^2 + [L_{qs}(L_{qs}i_{qs}^r)]^2}} \quad \text{[Equation 24]}$$

$$(-L_{ds}(L_{ds}i_{ds}^r + \lambda_f), -L_{qs}(L_{qs}i_{qs}^r))$$

The Equation discriminating the flux weakening control region I and the flux weakening control region II may be obtained as under by inner product of Equations 22 and 24:

$$(X_{norm}, Y_{norm}) \cdot (V_{norm}, W_{norm}) = |(X_{norm}, Y_{norm})||(V_{norm}, W_{norm})|\cos\theta = \cos\theta \quad \text{[Equation 25]}$$

Figure 5:
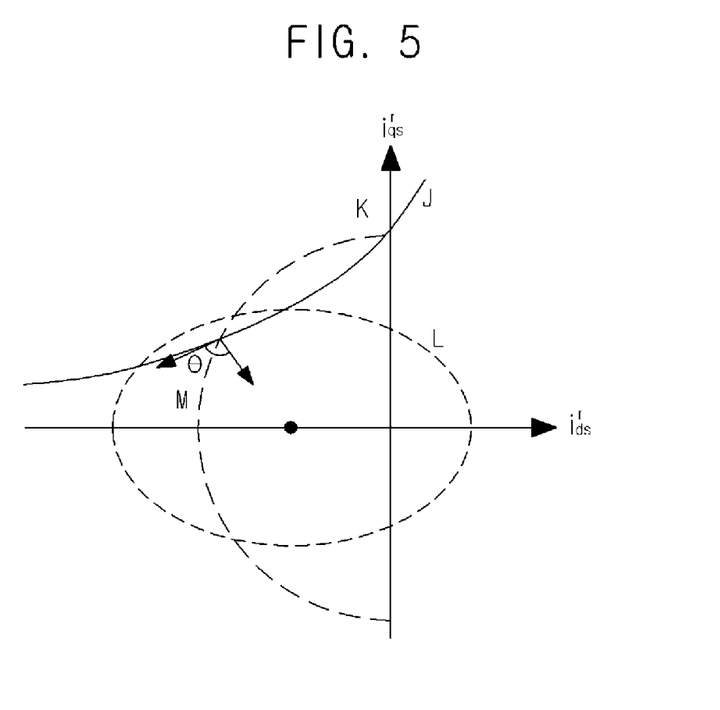
FIG. 5 is a schematic view illustrating a concept of Equation 25 according to an exemplary embodiment of the present disclosure.

FIG. 5 is a schematic view explaining a concept of Equation 25 according to an exemplary embodiment of the present disclosure.

J is a constant torque line of Equation 18, K is a current limit circle, L is a voltage limit ellipse, and M explains a relationship with Equation 25.

If Equation 25 satisfied the condition of the following Equation 26, a driving region of IPMSM (20) is discriminated as being changed from the flux weakening control region I to the flux weakening control region II.

$$|(X\_norm, Y\_norm) \cdot (V\_norm, W\_norm)| = |\cos\theta| \leq \epsilon \quad \text{[Equation 26]}$$

Now, the current command correction according to the present invention will be explained.

The current command correction unit (11) in FIG. 4 synthesizes the current command of the flux weakening control region I of IPMSM (20) to output the d and q-axes current commands on the synchronous reference frame in order to increase the voltage utilization rate of the inverter unit (16) in the flux weakening control region II of IPMSM (20).

At this time, if the condition of Equation 26 is not satisfied, the current command correction is not performed, and the current command correction is performed only if the condition of Equation 26 is satisfied.

The size of over-modulated voltage returned from the voltage feedback unit (12) of FIG. 4 may be obtained by the following Equation 27. At this time, the size of voltage synthesized by the inverter unit (16) is such that the voltage limiter (15) is limited by the voltage limit hexagon to increase the voltage utilization rate of the inverter unit (16).

$$\Delta V_{mag} = \sqrt{(V_{ds}^{s*} - V_{ds}^{s})^2 + (V_{qs}^{s*} - V_{qs}^{s})^2} = \sqrt{(V_{ds}^{r*} - V_{ds}^{r})^2 + (V_{qs}^{r*} - V_{qs}^{r})^2}$$ [Equation 27]

At this time, the Equation 27 has the following relationship.

$$V_{ds}^{s*} = V_{ds}^{r*}\cos\theta - V_{qs}^{r*}\sin\theta$$ [Equation 28]

$$V_{qs}^{s*} = V_{ds}^{r*}\sin\theta + V_{qs}^{r*}\cos\theta$$ [Equation 29]

$$V_{ds}^{s} = V_{ds}^{r}\cos\theta - V_{qs}^{r}\sin\theta$$ [Equation 30]

$$V_{qs}^{s} = V_{ds}^{r}\sin\theta + V_{qs}^{r}\cos\theta$$ [Equation 31]

The voltage used by the current command correction unit (11) may be obtained by Equation 32 where Equation 27 is integrated and high-pass filtered.

$$\Delta V_{mod} = \frac{1}{s + \omega_c}\Delta V_{mag}$$ [Equation 32]

Figure 6:
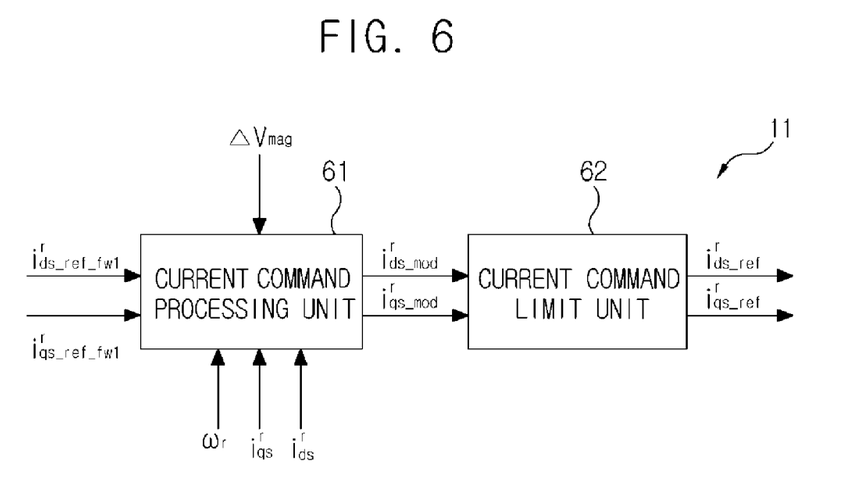
FIG. 6 is a detailed constructional view illustrating a current command correction unit of FIG. 4 according to an exemplary embodiment of the present disclosure.

FIG. 6 is a detailed constructional view illustrating a current command correction unit of FIG. 4 according to an exemplary embodiment of the present disclosure.

Referring to FIG. 6, the current command correction unit (11) of the present disclosure includes a current command processing unit (61) and a current command limiter (62).

The current command processing unit (61) functions to correct the current command of the flux weakening control region I to generate a current command of the flux weakening control region II, and the current command limiter (62) serves to limit the size of current from the current command corrected by the current command correction unit (61).

Now, an operation of the current command processing unit (61) will be described in the following manner.

The current command correction by the operating apparatus according to the present disclosure is to increase the voltage utilization rate in the flux weakening control region II. Furthermore, a direction of the current command in the flux weakening control region II faces toward a center of the voltage limit ellipse, such that the direction is same as that of Equation 24. Still furthermore, the size of correction during current command suffices to be proportional to the size of over-modulated voltage of Equation 27, which may be defined by the following Equation.

$$i_{ds\_mod}^{r} = i_{ds\_ref\_fw1}^{r} + \alpha_1 \frac{1}{s + \omega_c}\Delta V_{mag}V_{norm}$$ [Equation 33]

$$i_{qs\_mod}^{r} = i_{qs\_ref\_fw1}^{r} + \alpha_2 \frac{1}{s + \omega_c}\Delta V_{mag}W_{norm}$$ [Equation 34]

where α1 and α2 represent variable gains, which may be set up to be proportional to speed as per the following:

$$\alpha_1 = \alpha_{mod1}\frac{\omega_{rpm}}{\omega_{rpm,max}}$$ [Equation 35]

$$\alpha_1 = \alpha_{mod2}\frac{\omega_{rpm}}{\omega_{rpm,max}}$$ [Equation 36]

where, $\alpha_{mod1}$ and $\alpha_{mod2}$ represent arbitrary proportional gains, $\omega_{rpm}$ represents a current rotor speed and $\omega_{rpm,max}$ represents a maximum rotor speed.

Figure 7:
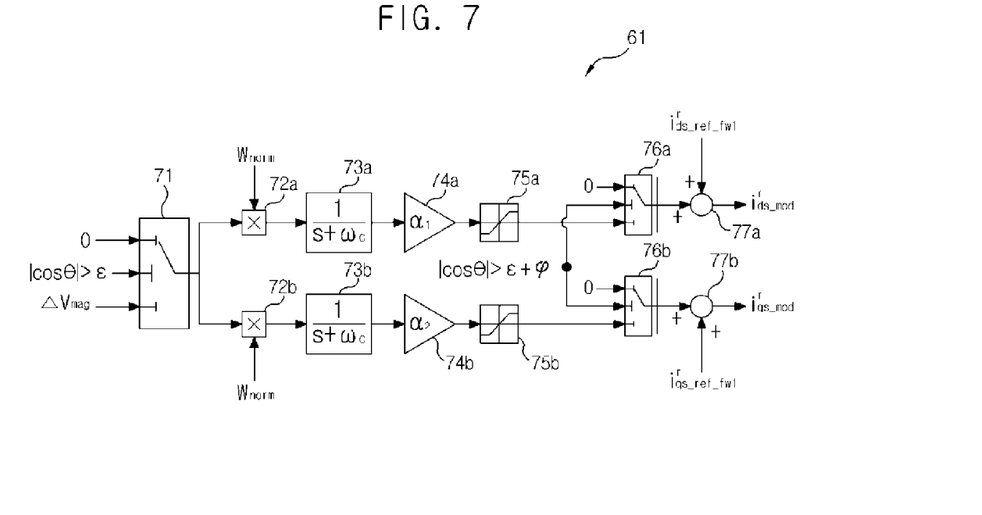
FIG. 7 is a detailed constructional view illustrating a current command processing unit of FIG. 6 according to an exemplary embodiment of the present disclosure.

FIG. 7 is a detailed constructional view illustrating a current command processing unit of FIG. 6 according to an exemplary embodiment of the present disclosure.

Referring to FIG. 7, the current command processing unit (61) according to the present disclosure comprises a decision unit (71), direction determination units (72a, 72b), first calculation units (73a, 73b), gain calculation units (74a, 74b), first limit units (75a, 75b), section defining units (76a, 76b) and adding units (77a, 77b).

The decision unit (71) decides the flux weakening control regions. To be more specific, the decision unit (71) decides that a current correction is not performed for the flux weakening control region II if the size of the cosine function is greater than a predetermined value according to Equation 26.

The direction determination units (72a, 72b) determine the direction of correction of the current command. The first calculation units (73a, 73b) perform calculation of Equation 23. The gain calculation units (74a, 74b) calculate the proportional gains in Equations 35 and 36, and the first limit units (75a, 75b) limit the size of the current change.

The section defining units (76a, 76b) define a hysteresis section for dividing the flux weakening control region I and the flux weakening control region II. The adding units (77a, 77b) output a final current command by adding a reference current to an output of the section defining units (76a, 76b).

Now, the current command limiter of FIG. 6 will be described in detail.

The current command corrected by the current command processing unit (61) of FIG. 6 must exist within a current range outputtable by the inverter unit (16).

At this time, the limitation of current command provides priority to the d-axis current, and the d-axis current on the synchronous reference frame corrected by Equation 33 is outputted within the size of the rated current on a priority base, where a q-axis current command selects as a permissible range a balance where a size of d-axis current is deducted from the rated current.

Figure 8:
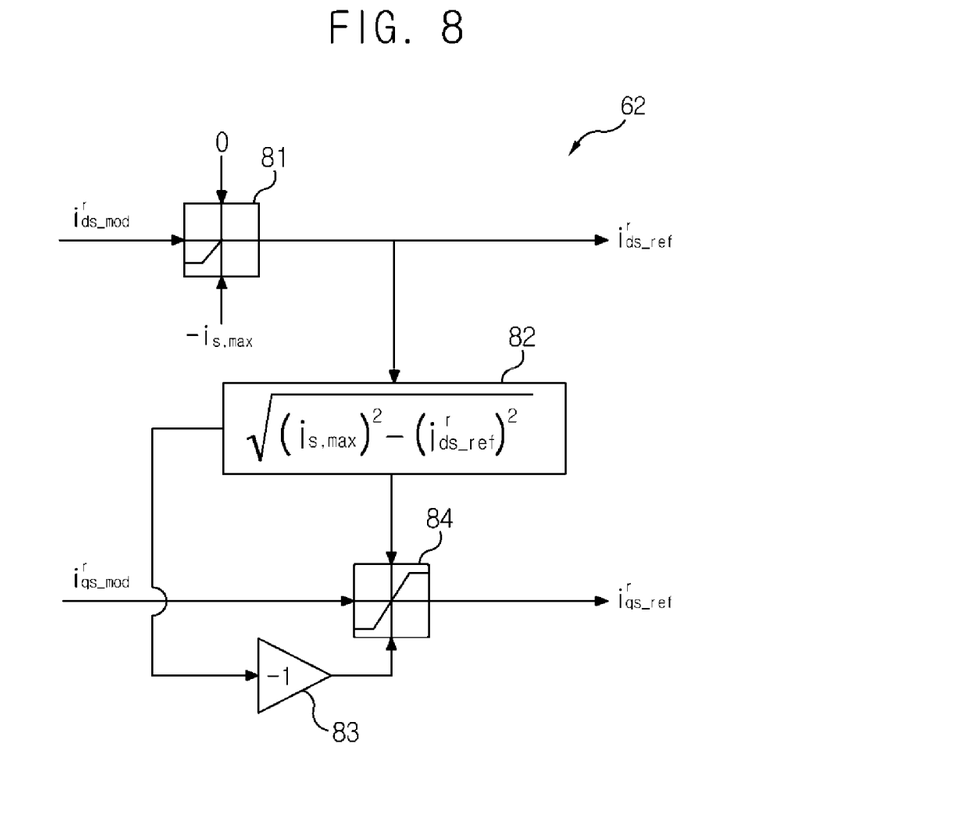
FIG. 8 is a detailed constructional view illustrating a current command limiter of FIG. 6 according to an exemplary embodiment of the present disclosure.

FIG. 8 is a detailed constructional view illustrating a current command limiter of FIG. 6 according to an exemplary embodiment of the present disclosure.

Referring to FIG. 8, the current command limiter (62) according to the present disclosure comprises a second limiter (81), a second calculator (82), a third calculator (83) and a third limiter (84).

The second limiter (81) limits in such a manner that the corrected d-axis current outputted by the adding unit (77a) exists within an allowable current range. The second calculator (82) obtains a positive q-axis maximum allowable current range from the d-axis current outputted from the second limiter (81) and the allowable current.

The third calculator (83) calculates a negative q-axis maximum allowable current range. The third limiter (84) limits the size of q-axis current based on the second and third calculators (82, 83).

The operation in the flux weakening control region II of IPMSM according to the present disclosure is realized by correction of current command using a difference between an output voltage of a current controller (13) and a voltage actually synthesized by an inverter unit (16).

As apparent from the foregoing, the apparatus for operating interior permanent magnet synchronous motor according to the present disclosure has an industrial applicability in that a difference between two voltages is minimized using a difference between an output voltage of a current control unit and a voltage actually synthesized by an inverter unit, and dispensing with a prior-prepared look-up table, all the voltage limit hexagons are used to increase a DC-link voltage utilization rate of the inverter unit relative to size of the voltage synthesized by the inverter unit, and a current command is corrected to a direction holding a torque at a predetermined level, whereby a maximum torque can be outputted even when an IPMSM is driven at a high speed.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for operating interior permanent magnet synchronous motor (IPMSM) by receiving a first current command of a flux weakening control region I in a system including a detector measuring a position and a speed of a rotor of the IPMSM, the apparatus comprising: a feedback unit transmitting over-modulated voltage information to a correction unit; the correction unit using the rotor speed and the over-modulated voltage information to correct the first current command to a second current command of a flux weakening control region II; a control unit controlling the second current command to output a voltage; a first limit unit limiting an output of the control unit to a maximum voltage synthesizable by an inverter unit; and the inverter unit applying a 3-phase voltage command for following a command torque to the IPMSM using an output of a voltage limit unit;
wherein the correction unit comprises a processing unit correcting the first current command to generate the second current command in case of flux weakening control region II, and a second limit unit limiting a size of current from the second current command;
wherein the processing unit comprises a decision unit determining the flux weakening control region II, a determination unit determining a direction of correction of current command, a calculation unit calculating a proportional gain using a current rotor speed and a maximum rotor speed, a third limit unit limiting a size of the current change, a section defining unit defining a hysteresis section for defining the flux weakening control region I and the flux weakening control region II, and an adding unit outputting the second current command by adding a reference current to an output of the section defining unit.

2. The apparatus of claim 1, further comprising a first conversion unit converting a voltage of the control unit on synchronous reference frame to a voltage on stationary reference frame using position information of the rotor received from the detector and outputting the converted voltage to the first limit unit.

3. The apparatus of claim 1, further comprising a current sensor measuring a phase current outputted from the inverter unit to the IPMSM.

4. The apparatus of claim 3, further comprising a second conversion unit converting a phase current on stationary reference frame received from the current sensor to a current on the synchronous reference frame and providing the converted current to the correction unit and the control unit.

5. The apparatus of claim 1, wherein the feedback unit feedbacks the over-modulated voltage between the output of the control unit and the voltage synthesized by the inverter unit to the correction unit.

6. The apparatus of claim 5, wherein the feedback unit integrates and high-pass filters a size of the over-modulated voltage, and transmits the high-pass filtered size to the correction unit.

7. The apparatus of claim 1, wherein the second limit unit limits the second current command to a current range outputtable by the inverter unit.

8. The apparatus of claim 1, wherein the second limit unit provides a priority to a d-axis current on the synchronous reference frame relative to the second current command, outputs the d-axis current within the size of a rated current on a priority base, and selects a q-axis current command in a permissible range a balance where a size of d-axis current is deducted from the rated current.

9. The apparatus of claim 1, wherein the first limiting unit limits an output of the control unit by using a voltage limit hexagon.

* * * * *